BISTABLE MAGNETIC FILM AND METHOD FOR MAKING SAME

Filed May 8, 1961

INVENTOR

Donald C. Bennett,

BY Watson, Cole, Grindle, Watson

ATTORNEYS

United States Patent Office 3,232,787

Patented Feb. 1, 1966

3,232,787
BISTABLE MAGNETIC FILM AND METHOD FOR MAKING SAME

Donald C. Bennett, 7 Sullivan Way, East Brunswick, N.J.

Filed May 8, 1961, Ser. No. 108,492
5 Claims. (Cl. 117—107.2)

This invention relates to the production of bistable magnetic devices, and more particularly to a method employing thermal strain to produce thin film binary storage devices and the storage devices produced by the method. This invention is disclosed in my thesis entitled, A Study of Thin Nickel Films which was presented in printed form to the Graduate Faculty of Lehigh University on May 20, 1960. The entire thesis is hereby incorporated by reference in this application.

Thin films of ferromagnetic materials are useful as binary memory devices, that is, as a means of storing binary information. Generally, films for use as memory devices are magnetized in a specified direction in the plane of the film or at substantially 180° to this direction, also in the plane of the film. It is the sense of magnetization that constitutes the "bit" of information that is stored. Various methods of making thin film memories are disclosed in Preceedings of IRE, January 1961, in an article entitled Computer Memories—A Survey of the State of the Art by Jan Rajachman, page 104.

The information stored in a film may be determined by means of two circuit elements positioned adjacent the film. One of these applies a field in one of the two possible directions of magnetization, and the other detects a change of magnetic field in this direction. To "read" the information that is stored in the film, the first element pulses a magnetic field of sufficient strength to switch the magnetization from the opposite direction, if it is so magnetized, to the parallel direction. If the film is magnetized in a direction opposed to the applied field, the switching of its magnetization induces a voltage pulse in the sensing element. If it is already magnetized in this direction, no voltage pulse is induced. The presence, or absence, of such a pulse reveals the information that is stored.

Therefore, to act effectively as a memory device, it is necessary for the film to possess certain magnetic characteristics. One of the most important of these is a very low coercive force. This is desired because it reduces the power required to switch the sense of magnetization of the film. Another important property is a square B-H loop, or hysteresis loop, both because it generally implies a more rapid switching, once sufficient field strength is reached, and also because in a film with a square loop, small stray signals will not change its magnetization. Of course, the intensity of magnetization should be large, so that a small film can induce a large signal.

The material commonly used for metallic memory films is permalloy—near the 80% Ni-20% Fe composition that has a zero, or negligible, coefficient of magnetostriction. A zero coefficient of magnetostriction has the advantage that stresses in the production or packaging of the films will not effect the magnetic properties of the device.

Almost without exception, permalloy thin films are made by vapor deposition techniques. In the vapor deposition method, an alloy of iron and nickel is held molten in a vacuum chamber, and the alloy is evaporated from the melt onto a warm glass substrate.

Because the mechanism of magnetic annealing is not clearly understood, the response to magnetic annealing is not entirely reliable. Applicant, however, has discovered that reliable results may be achieved in the production of bistable magnetic films by employing stress in the production of the difficult or hard direction, as well as an easy direction, of magnetization. As shown in FIGURE 3, applicant has further discovered that this stress can be produced advantageously by the application of a thin magnetic film to a substrate which has coefficients of thermal expansion that are different in different directions in the plane of the substrate. Preferably, in one direction, the coefficient of thermal expansion of the substrate should be greater than that of the film and less than that of the film in a direction perpendicular to the first and in the plane of the film. If the film has a negative coefficient of magnetostriction, the former direction will be the easy direction and the latter direction will be the hard direction. Should the film have a positive coefficient of magnetostriction, the easy and hard directions will be reversed.

In utilizing these novel concepts, applicant employs "X" cut quartz crystals since these crystals exhibit substantially ideal thermal expansion coefficients for the particular magnetic film employed. In this illustrative embodiment, thin, substantially pure nickel films are employed. However, it will be understood by those skilled in the art, that in view of the broad concepts which are the subjects of this invention, other magnetic films and other substrates may be employed. The coefficient of thermal expansion for quartz crystal in one direction is $7.9\times10^{-6}$, and in a substantially perpendicular direction, this coefficient is $13.3\times10^{-6}$. These two coefficients therefore possess the correct relationship to the coefficient of thermal expansion for nickel which is $13\times10^{-6}$.

Stated in a more general manner, the method for producing this bistable magnetic film comprises the deposition of an isotropic film on an anisotropic substrate. The bistable film thus produced is more reliable and more uniform than that produced by the previously-mentioned magnetic annealing technique.

These and various other objects and features of the invention will be more clearly understood from a detailed reading of the specification in conjunction with the drawing, in which.

Figure 1:
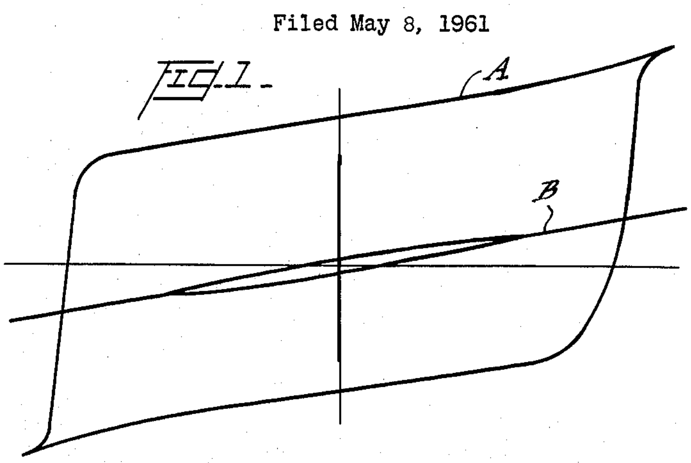
FIGURE 1 is a graphical representation of a B-H loop of a nickel film deposited on an "X" cut quartz crystal, the respective loops being measured in the easy and hard directions of magnetization.
Figure 3:
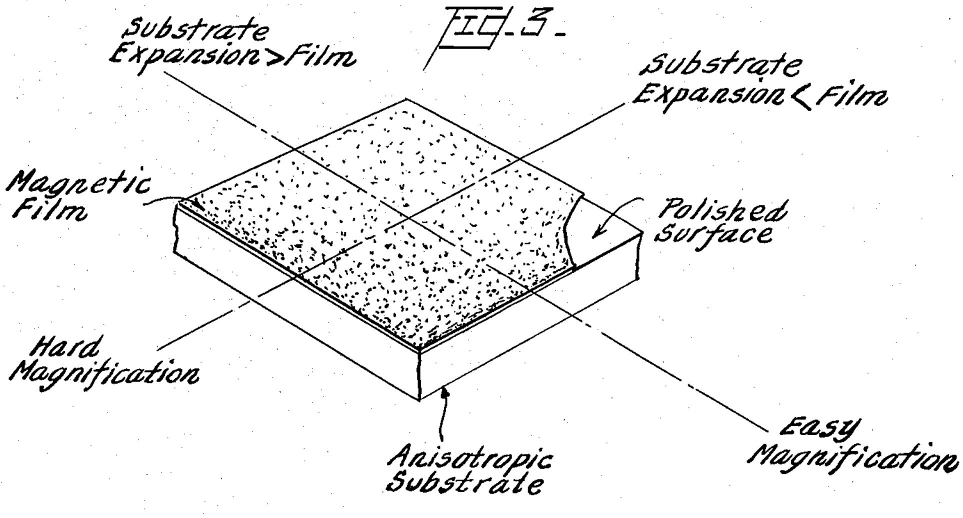
FIGURE 3 is a diagrammatic view of an article constructed in accordance with the invention.

The production of metallic films by thermal decomposition is basically a two step process. First, a molecular species containing the metal desired in the film is vaporized. For example, nickel acetylacetonate is employed. Secondly, the vapor is passed to an inert environment where the molecule decomposes, liberating the metallic element (nickel) and volatile decomposition products.

Of course, there are many requirements in any practical thermal decomposition process. Among these are:

(1) The compound must be available in substantially pure form.

(2) The compound must have an adequate vapor pressure at temperatures safely below the decomposition temperature and preferably above room temperature.

(3) The compound must decompose at temperatures that are low enough to prevent damage to the substrate, but above the vaporization temperature.

(4) The compound should decompose to yield the metallic atom, or atoms.

(5) All other decomposition products of the compound must be volatile.

(6) The volatile reaction products must be of a type or in such concentrations that they will not react with or contaminate the metal deposited.

(7) It is desirable that on decomposition the compound yield no excessively toxic products.

(8) The deposition temperature must have the proper relation to the temperature of operation of the memory device so that the strain will be elastic and not of a nature to produce plastic deformation.

Nickel and iron pentacarbonyls are the best known of the transition metal bearing vapors and meet the above requirements, except for their extreme toxicity. Because of the complexity of the apparatus needed to insure safe operation, they are not practical for the decomposition process.

Another metal bearing vapor is the metal acetylacetonate. The decomposition reaction is:

$$NiAA(g)=Ni+(CH_3)_2CO+CH_4+H_2O+\text{"hydrocarbons"}$$

This reaction is brought about in a decomposition chamber at a temperature of the order of 340° C. The gases generated in the decomposition chamber are fed through a suitable filter, such as glass wool plugs. These plugs prevent any solid particles from reaching the substrate in the decomposition tube which is connected to the decomposition chamber.

According to this method, a thin nickel film is deposited on a well-polished "X" cut quartz crystal by the above-mentioned thermal decomposition process, well known in the art. It is important that during the step of deposition, that the temperature of the surrounding media be maintained between the vaporization and decomposition temperatures of the material being deposited. If the temperature is too high; namely, above the decomposition temperature, then the molecules to be deposited decompose in the surrounding media releasing the metal from the deposition compound, which metal settles to the substrate and produces an objectionable deposit on the film. Alternatively, if the temperature employed is below the vaporization temperature, then the deposition compound will not be vaporized and deposited on the substrate.

For the purpose of practicing this method, a nickel film may be formed by the thermal decomposition of nickel acetyl acetonate. However, it will be understood that other compounds may be employed. The permeability of these films increases with decreasing film thickness. There is no clearly defined thickness below which square loops are obtained, rather there is a steady increase in permeability as the thickness decreases below 1500 A. This thickness may be mathematically determined in a manner well known in the art from magnetic measurements on films that can be saturated magnetically, and thus those films which would exhibit a substantially rectangular hysteresis loop.

Figure 2:
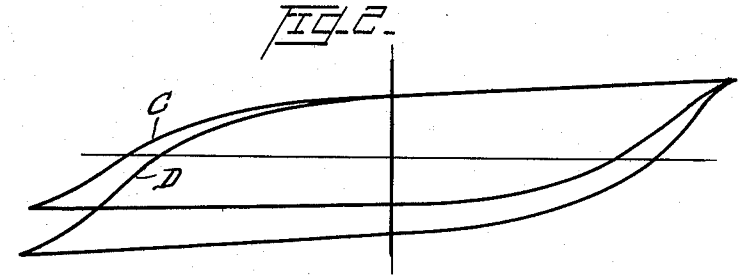
FIGURE 2 is a graphical representation of B-H loops of nickel film after the film has been removed from the "X" cut quartz crystal, the respective loops being measured in the easy and hard directions of magnetization.

FIGURE 1 shows a graphical representation of the B-H loops of nickel film deposited by the decomposition method on "X" cut quartz crystals measured in the easy direction of magnetization (curve A) and in the difficult direction of magnetization (curve B). It particularly is to be noted that there is marked difference between the hysteresis loops in these two directions. Curve B is a substantially straight line enclosing a very small area at the point of intersection or origin of the co-ordinate system, whereas curve A is substantially rectangular enclosing a relatively large area. These distinct magnetization characteristics are definitely attributable to the combination of anisotropic substrate and the isotropic film. This is established by reference to FIGURE 2 which shows the B-H loops of nickel film which have been stripped from the substrate, as therein indicated by curves C and D which represent a hard and an easy direction of magnetization respectively, and which are substantially identical. Thus the magnetic characteristics exhibited in FIGURE 2 would preclude the use of the thin film as a bistable magnetic memory.

As indicated above, the use of this particular method is not restricted to any particular substrate. It is merely necessary that the substrate exhibit dissimilar thermal expansion coefficients in opposite directions.

While I have shown and described certain illustrative embodiments of this invention, it is understood that the concepts thereof may be applied to other embodiments without departing from the spirit and scope of this invention.

What is claimed is:

1. An article of manufacture comprising in combination, a bistable magnetic film exhibiting isotropic coefficients of thermal expansion in the plane of the film deposited upon a substrate surface exhibiting anisotropic coefficients of thermal expansion in two angular directions on the surface containing said film, wherein one of said anisotropic coefficients is less than the coefficient of said film, and said magnetic film has an easy and a hard direction of magnetization in the two angular directions lying in the film corresponding in direction to said directions in said substrate.

2. The method of making a bistable magnetic film to impart an easy and a hard direction of magnetization in the plane of the film comprising the steps of preparing a substrate surface of material exhibiting anisotropic coefficients of thermal expansion in two directions on the surface of said substrate corresponding to said easy and hard directions of magnetization, and depositing a magnetic film exhibiting an isotropic coefficient of thermal expansion on said surface thereby establishing said easy and hard directions of magnetization in an ordered direction.

3. The method defined in claim 2 wherein the magnetic film is deposited by thermally decomposing nickel acetyl acetonate in a chamber filled with an inert gas.

4. The method defined in claim 2 wherein the substrate is prepared to exhibit one said coefficient of expansion which is substantially less than that of said magnetic film.

5. An article of manufacture comprising in combination, a bistable magnetic film exhibiting isotropic coefficients of thermal expansion in the plane of the film deposited upon a substrate surface exhibiting anisotropic coefficients of thermal expansion in two angular directions on the surface containing said film, wherein one of said anisotropic coefficients is less than the coefficient of said film, and said magnetic film has an easy and a hard direction of magnetization in the two angular directions lying in the film corresponding in direction to said directions in said substrate, wherein said film is substantially pure nickel and wherein said substrate is "X" cut quartz crystal.

References Cited by the Examiner

UNITED STATES PATENTS

| | | | |
|---|---|---|---|
| 2,392,429 | 1/1946 | Sykes | 117—107 |
| 2,671,034 | 3/1954 | Steinfeld. | |
| 2,853,402 | 9/1958 | Blois. | |
| 2,999,766 | 9/1961 | Ashworth et al. | |
| 3,092,511 | 6/1963 | Edelman | 117—107.2 |

FOREIGN PATENTS

| | | |
|---|---|---|
| 564,177 | 10/1958 | Canada. |
| 751,843 | 7/1956 | Great Britain. |
| 845,604 | 8/1960 | Great Britain. |

JOSEPH B. SPENCER, *Primary Examiner.*

RICHARD D. NEVIUS, WILLIAM D. MARTIN, *Examiners.*